(12) United States Patent
Kato et al.

(10) Patent No.: US 10,056,652 B2
(45) Date of Patent: Aug. 21, 2018

(54) POROUS COORDINATION POLYMER, GAS DETECTING MATERIAL AND LITHIUM ION SECONDARY BATTERY HAVING THE SAME

(71) Applicant: TDK CORPORATION, Tokyo (JP)

(72) Inventors: Tomohiko Kato, Tokyo (JP); Takayuki Maruyama, Tokyo (JP)

(73) Assignee: TDK CORPORATION, Tokyo (JP)

( * ) Notice: Subject to any disclaimer, the term of this patent is extended or adjusted under 35 U.S.C. 154(b) by 5 days.

(21) Appl. No.: 15/239,703

(22) Filed: Aug. 17, 2016

(65) Prior Publication Data

US 2017/0054183 A1 Feb. 23, 2017

(30) Foreign Application Priority Data

Aug. 21, 2015 (JP) ................. 2015-163296

(51) Int. Cl.
| | |
|---|---|
| *H01M 10/0525* | (2010.01) |
| *H01M 10/42* | (2006.01) |
| *H01M 10/48* | (2006.01) |
| *C08G 79/14* | (2006.01) |

(52) U.S. Cl.
CPC ........ *H01M 10/4228* (2013.01); *C08G 79/14* (2013.01); *H01M 10/0525* (2013.01); *H01M 10/488* (2013.01)

(58) Field of Classification Search
CPC ....................... H01M 10/0525; H01M 10/4228
See application file for complete search history.

(56) References Cited

FOREIGN PATENT DOCUMENTS

| JP | 2005-255651 A | 9/2005 |
|---|---|---|
| JP | 2009-026569 A | 2/2009 |

OTHER PUBLICATIONS

Tayagaki et al. (J. Phys. Chem. B 2005, 109, 14859-14867).*
Asai et al. (Journal of The Electrochemical Society, 148 (4) A305-A310 (2001).*
Niel et al., "Cooperative Spin Behavior in Cyanide-Bridged Fe(II)-M(II) Bimetallic 3D Hofmann-like Networks (M=Ni, Pd, and Pt)," Inorganic Chemistry, 2001, vol. 40, pp. 3838-3839.
Boldog et al., "Spin-Crossover Nanocrystals with Magnetic, Optical, and Structural Bistability Near Room Temperature," Angewandte Chemie International Edition, 2008, vol. 47, pp. 6433-6437.
Southon et al., "Dynamic Interplay between Spin-Crossover and Host-Guest Function in a Nanoporous Metal-Organic Framework Material," Journal of the American Chemical Society, 2009, vol. 131, pp. 10998-11009.

* cited by examiner

*Primary Examiner* — Olatunji Godo
(74) *Attorney, Agent, or Firm* — Oliff PLC

(57) ABSTRACT

A porous coordination polymer represented by the following formula (1), wherein, the ratio A/B of the diffraction peak intensity A of (001) plane to the diffraction peak intensity B of (110) plane is 0.8 or more and 5.8 or less, $$Fe_x(pz)[Ni_{1-y}M_y(CN)_4] \quad (1)$$

wherein, pz=pyrazine, $0.95 \le x < 1.05$, M=Pd, Pt, $0 \le y < 0.15$. Also described is a gas detecting material and a lithium ion secondary battery having the porous coordination polymer.

7 Claims, 2 Drawing Sheets

POROUS COORDINATION POLYMER, GAS DETECTING MATERIAL AND LITHIUM ION SECONDARY BATTERY HAVING THE SAME

The present invention relates a porous coordination polymer, a gas detecting material and a lithium ion secondary battery having the gas detecting material.

BACKGROUND

At present, in fields of deodorizing, degas processing or the like, varies of adsorbents are used. Activated carbon or zeolite are representative examples and can be widely used in varies industries such as air purification, desulfurization, de-nitration, harmful substances removing or the like. Activated carbon has pores of varies sizes and can take varies kinds of molecules in the pores, however, it is not suitable for the application in which only the target molecule is selected to be adsorbed sufficiently. In addition, zeolite has uniform micropores, thus, it is a better substance for selectively adsorbing than activated carbon. However, the pores of zeolite are formed by chunky silicon and wall of oxides of aluminium, thus, it is short in the adsorbed amount.

Herein, a porous coordination polymer is promising which can modify the shape and the size freely by having a large specific surface area and further changing the metal ions or the organic ligands which cross-linking the metal ions (Patent document 1).

In non-patent document 1, a porous coordination polymer Fe(pz)[Ni(CN)$_4$] (pz=pyrazine) is disclosed, but the amount of the adsorbed gas per 1 mol of the porous coordination polymer is not sufficient.

PATENT DOCUMENTS

Patent Document 1: JP2005-255651A

Non-Patent Documents

Non-Patent Document 1: Journal of the American Society, 2009, vol 131, p. 10998-11009

SUMMARY

The present invention is made in view of the above problems and aims to provide a porous coordination polymer, a gas detecting material and a lithium ion secondary battery having the gas detecting material which has a better gas adsorption property.

The inventors of the present invention do a lot of researches and find that the above aim can be reached by using a porous coordination polymer with the following characters and thus complete the present invention, wherein, the porous coordination polymer is characterized in that it can be represented by the following Formula (1), and the ratio (A/B) of the diffraction peak intensity A of (001) plane to the diffraction peak intensity B of (110) plane is 0.8 or more and 5.8 or less.

(pz=pyrazine)
(0.95≤x<1.05, M=Pd, Pt, 0≤y<0.15)

That is, the present invention provides the following inventions.

[1] A porous coordination polymer according to one aspect of the present invention is a porous coordination polymer represented by the following Formula (1) and the ratio (A/B) of the diffraction peak intensity A of (001) plane to the diffraction peak intensity B of (110) plane is 0.8 or more and 5.8 or less.

(pz=pyrazine)
(0.95≤x<1.05, M=Pd, Pt, 0≤y<0.15)

[2] A gas detecting material according to one aspect of the present invention comprises the porous coordination polymer according to the above one aspect of the present invention [1].

[3] A gas detecting material according to one aspect of the present invention comprises the porous coordination polymer according to the above one aspect of the present invention [1], wherein, the porous coordination polymer further comprises at least one selected from the group consisting of acetonitrile or acrylonitrile and wherein the porous coordination is in a low-spin state.

[4] A lithium ion secondary battery according to one aspect of the present invention comprises the gas detecting material according to the above one aspect of the present invention [2] or [3].

According to the present invention, a porous coordination polymer, a gas detecting material and a lithium ion secondary battery having the gas detecting material with an excellent gas adsorption property can be provided.

DETAILED DESCRIPTION OF EMBODIMENTS

Hereinafter, the embodiments of the present invention will be described in detail with reference to the drawings. However, the present invention is not restricted by the contents disclosed in the following embodiments.

The porous coordination polymer of the present embodiment can be represented by the following formula (1) and the ratio (A/B) of the diffraction peak intensity A of (001) plane to the diffraction peak intensity B of (110) plane is 0.8 or more and 5.8 or less.

(pz=pyrazine)
(0.95≤x<1.05, M=Pd, Pt, 0≤y<0.15)

Figure 1:
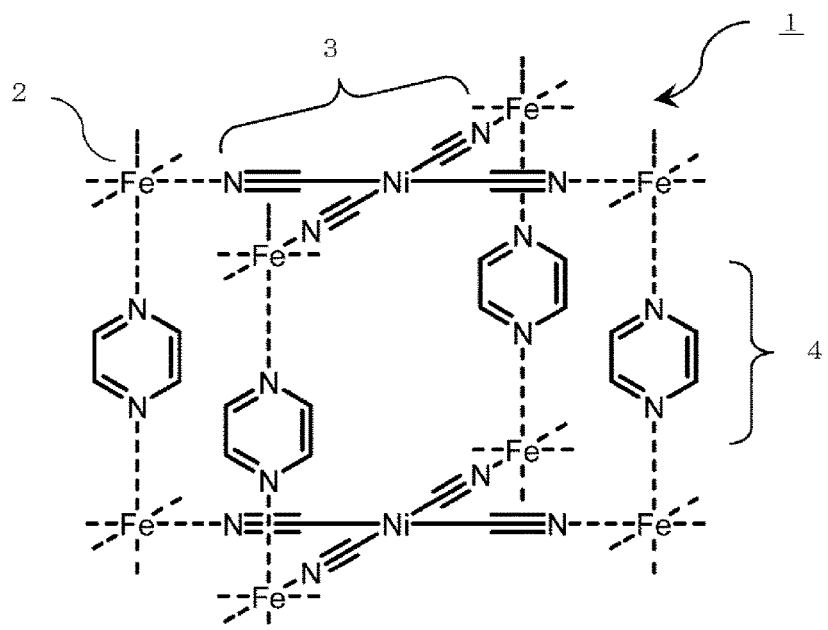
FIG. 1 is a schematic view showing the primary chemical structure of the porous coordination polymer of the present invention.

As shown in FIG. 1, the porous coordination polymer 1 has a structure in which tetracyanonickelate ion 3 and pyrazine 4 are Self-assembly regularly coordinated onto ferrous ion 2 and the jungle gym type skeleton stretched and the inner space can absorb varies of molecules or the like. In addition, a part of nickel can be replaced by at least one selected from palladium and platinum.

It is thought that when the porous coordination polymer can be represented by the Formula (1) and the ratio (A/B) of the diffraction peak intensity A of (001) plane to the diffraction peak intensity B of (110) plane is 0.8 or more and 5.8 or less, the stability of the gas adsorbed into the inner of the porous coordination polymer will be improved and the amount of the adsorbed gas per 1 mol of the porous coordination polymer will be increased. It is considered that there is crystallizing direction in which gas adsorption and desorption is easy in the porous coordination polymer. When the ratio (A/B) of the peak intensity is 0.8 or more and 5.8 or less, the adsorbed gas depart from the inner of the particles and the distance to the surface is long, thus, the adsorbed gas is stabilized. In addition, it is found that when the ratio (A/B) of the peak intensity is larger than 5.8, defects such as cracks or splits are tend to be increased. It is considered that the stability of the adsorbed gas nearby the defects will be reduced and thus the adsorbed amount per 1 mol of porous coordination polymer will be small.

In porous coordination polymer 1, a phenomenon called as spin crossover is noticed, wherein the electron configuration of ferrous ions varies between two states which are called as high-spin state and low-spin state by external stimulations such as heat, pressure, or the adsorption of molecule. The spin variation can be considered to be in several tens of nano-seconds and has a character of a very high response speed.

The high-spin state refers to the state where the electrons are configured in a way that the spin angular momentum becomes the biggest according to the Hund's rule in the 5 orbits of the d electron of the ferrous ions in the complex. The low-spin state refers to the state where the electrons are configured in a way that the spin angular momentum becomes the smallest. The two states are different in the states of the electron and the distances in the lattice, thus, the colors and the magnetisms of the complexes in the two states are different. That is, if the spin crossover phenomenon caused by the adsorption of the molecule onto the porous coordination polymer is used, the porous coordination polymer can be used as the detecting material which can detect specific molecules expeditiously.

The porous coordination polymer in the high-spin state is orange and it will turn to reddish purple of the low-spin state if it is cooled sufficiently by liquid nitrogen or the like. In addition, if it is exposed in the gas of specific organic compounds such as acetonitrile or acrylonitrile or the like, the gas will be adsorbed into the inner of the crystal and turn to be the low-spin state. If the porous coordination polymer of reddish purple in the low-spin state is exposed in the organic compound gas which induces the high-spin state, it will take gas into the inner of the jungle gym type skeleton and turn to be orange of the high-spin state by the spin crossover phenomenon. As the gases of the organic compounds, vapors such as organic combustible gas or volatile organic solvent or the like can be listed as examples. That is, when the porous coordination polymer in the low-spin state is in an atmosphere with gas of an electrolyte solution for lithium ion secondary battery such as dimethyl carbonate (hereinafter, referred as DMC), diethyl carbonate (hereinafter, referred as DEC), and ethyl methyl carbonate (hereinafter, referred as EMC) or the like or gas(es) such as ethylene and propylene or the like which is/are produced by the decomposition of the electrolyte solution mentioned above existing, the porous coordination polymer will adsorb these gases, and change orange in the high-spin state. In sum, the porous coordination polymer can be used as a gas detecting material by confirming the colors visually, or confirming the weight change of the adsorbed gas of the porous coordination polymer, or analyzing the adsorbed gas of the porous coordination polymer.

Figure 2:
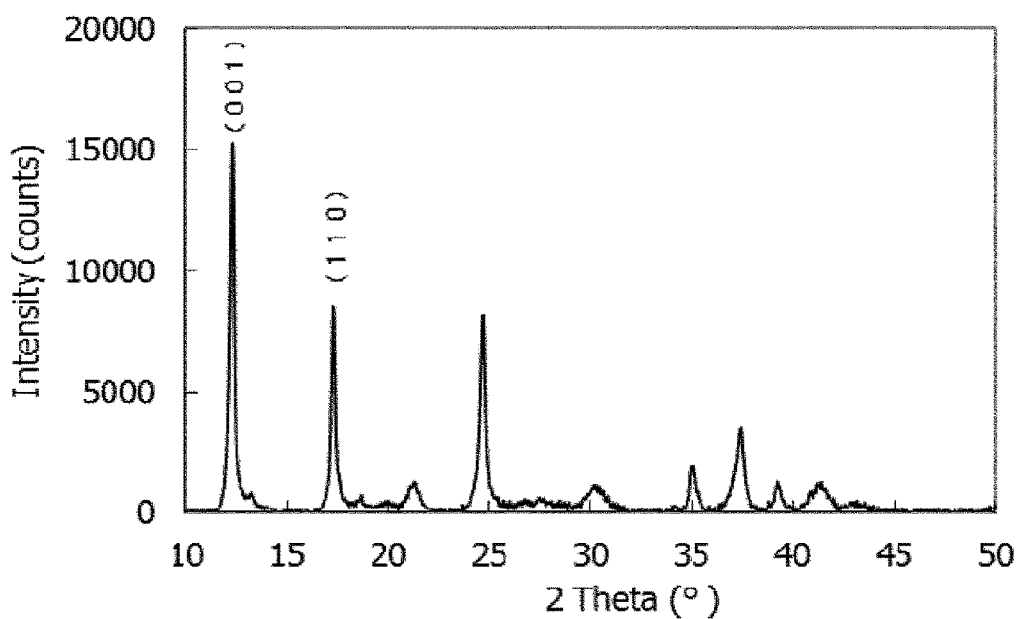
FIG. 2 is an X-ray powder diffraction pattern of the porous coordination polymer of the present invention.

FIG. 2 is an X-ray powder diffraction pattern of the porous coordination polymer of the present invention. The calculation method of the ratio (A/B) of the diffraction peak intensity A of (001) plane near $2\theta=11\sim13°$ to the ratio of the diffraction peak intensity B of (110) plane near $2\theta=16\sim18°$ measured by the X-ray powder diffraction method is as follows. The measured sample is prepared by sprinkling the porous coordination polymer particles into the cavity part of the sample holder and removing the surplus sample and uniformizing the height of the surface of the sample holder and the measuring surface of the sample. The measuring sample is set in the X-ray analytical instrument 'Ultima IV' made by Rigaku Corporation. The diffraction peak intensity A of the diffraction peak of (001) plane near $2\theta=11\sim13°$ and the diffraction peak intensity B of the diffraction peak of (110) plane near $2\theta=16\sim18°$ are measured respectively. The ratio (A/B) of the peak intensity is calculated by dividing diffraction peak intensity A using diffraction peak intensity B.

Conditions for Measuring
Filter: Ni
Target: Cu K$\alpha$ 1.54060 Å
X-ray output setting: 40 kV-40 mA
Slit: divergence ½°, scattering: ½°, Light received: 0.15 mm
Scanning speed: 4°/min
Sampling width: 0.02°

Referring to the composition of the porous coordination polymer of present embodiment, it can be confirmed by using ICP (inductively coupled plasma) atomic emission spectrophotometry, carbon/sulfur analysis, oxygen/hydrogen analysis or the like.

The spin state of the porous coordination polymer of the present embodiment can be confirmed by observing the response of the magnetization relative to the magnetic field using superconducting quantum interference device (SQUID) or vibrating sample magnetometer (VSM).

The amount of the adsorbed gas of the porous coordination polymer of the present embodiment can be calculated by the following method. First, put the porous coordination polymer which has been performed with drying process for 3 hours under 150° C. in the atmosphere into the saturated gas of ethylene, propylene, toluene, xylene, acetone, ethyl acetate, tetrahydrofuran, methanol, ethanol, n-propanol, isopropanol, triethylamine, acetic acid, acetonitrile, diethyl ether, DMC, EMC, DEC and the like for 24 hours. Then remove the adsorbed gas on the surface by drying under reduced pressure and thus prepare a porous coordination polymer with gas adsorbed inside. Evolved gas analyzing is performed for the prepared porous coordination polymer and confirmed the content of the gas evolved in the heating process. The adsorbed amount of the gas adsorbed in the inner part of the porous coordination polymer can be measured by confirming the reduced amount of the weight using thermogravimetric analysis.

With regard to the thermogravimetric analysis of the adsorbed gas in the porous coordination polymer of the present embodiment, 10 mg of sample is weighed to be added into an aluminium pan, the weight loss is confirmed in the nitrogen gas flow with a heating rate of 10° C./min until 220° C., the adsorbed amount per unit weight of the sample can be calculated.

With regard to the evolved gas analyzing of the adsorbed gas in the porous coordination polymer of the present embodiment, the mass number of the evolved gas can be confirmed using a gas chromatograph mass spectrometry equipped with a double-shot pyrolyzer.

In the method of the porous coordination polymer of the present embodiment, first, carry out the reaction of the ferrous salt, antioxidant, tetracyanonickelate, tetracyanopalladates and tetracyanoplatinate in a proper solvent to obtain an intermediate. Then dissolve the intermediate in a proper solvent and deposit the precipitate by adding pyrazine into the dispersion. At last a porous coordination polymer can be obtained by filtrating and then drying the precipitate.

As the ferrous salt, iron(II) sulfate heptahydrate, ammonium iron(II) sulfate hexahydrate or the like can be used. As the antioxidant, L-ascorbic acid or the like can be used. As the tetracyanonickelate, potassium tetracyanonickelate (II) hydrate or the like can be used. As the tetracyano palladates, potassium tetracyanopalladate(II) hydrate or the like can be used. As the tetracyanoplatinate, potassium tetracyanoplatinate(II) hydrate or the like can be used.

As the solvent, methanol, ethanol, propanol, water or the like, or the mixed solvent thereof or the like can be used.

It is preferable that a part or the whole of the gas detecting material of the present embodiment is in low-spin state. As the processing method for turning the gas detecting material into the low-spin state, methods can be listed such as cooling the gas detecting material sufficiently using liquid nitrogen or the like and then returning to normal temperature, contacting the gas detecting material with the chemical substance which can induce the low-spin state of the gas detecting material. As the chemical substance which can induce the low-spin state of the gas detecting material, acetonitrile and acrylonitrile can be listed as examples.

As the gas detecting material of the present embodiment, it is preferred that at least one selected from acetonitrile or acrylonitrile is contained. If the gas detecting material is contacted with the vapor of acetonitrile or acrylonitrile, it will adsorb acetonitrile or acrylonitrile into the crystals and it will be induced to turn to be the low-spin state. Thus, if acetonitrile or acrylonitrile is contained, the gas detecting material can be keep in the low-spin state.

Figure 3:
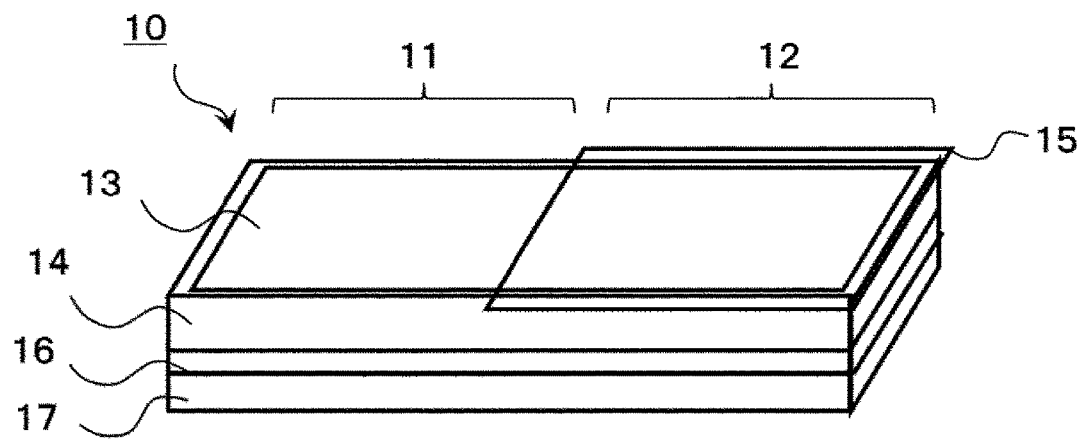
FIG. 3 is a schematic view showing the gas detector of the present invention.

FIG. 3 is a schematic view of the gas detector of the present embodiment. In FIG. 3, gas detector 10 contains detection part 11 and reference part 12 and on at least one surface of the supporter 14, gas detecting material layer 13 is installed.

The gas detecting material of detection part 11 contains porous coordination polymer. For example, when reddish purple porous coordination polymer in low-spin state is used in the gas detecting material of detection part 11, the porous coordination polymer will adsorb gas if gas of DEC or the like is existed, and it will change from reddish purple to orange. On the other hand, as gas detecting material layer 13 of reference part 12 will also show reddish purple of low-spin state when existing gas, it can be prevented to contact with gas by using protective layer 15. Otherwise, the low-spin state can also be maintained even under the existing of the detected gas by adsorbing substances which can make the low-spin state more stable than the detected gas without using protective layer 15. As stated above, if gas detector 10 of the present embodiment is used when the gas is existed, the existing of the gas can be easily detected by visually confirming the difference of the colors of detection part 11 and reference part 12.

Supporter 14 is not restricted, for example, cellulose-based pasteboard or the like can be used. The material for protective layer 15 is not specially restricted as long as it can prevent gas detecting material layer 13 of reference part 12 from contacting with gas atmosphere. For example, it can use polyvinylidene chloride film.

On the other face of the supporter, adhesive layer 16 and release paper 17 can be set in turn. When gas detector is used, it can be fixed by releasing the release paper and adhering on the place which is the gas detecting object. Adhesive layer 16 and release paper 17 can use well-known materials respectively.

Gas detecting material layer 13 of reference part 12 can be replaced with other coloring materials. If coloring materials having equal color tone with the color in the high-spin state or the low-spin state of the detecting material are used, the change of the color tune of the gas detection part can be confirmed visually. Further, the gas detector which is separated from the reference part and only has the detection part can also be used in gas detection if there are methods for confirming the change of the color tune by color samples or the like.

Figure 4:
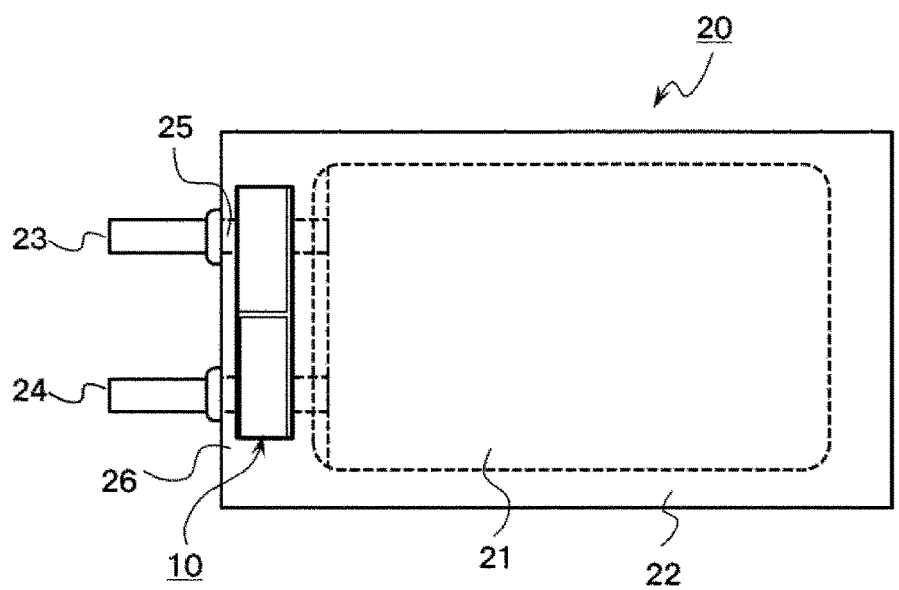
FIG. 4 is a schematic view showing the lithium ion secondary battery of the present invention.

The lithium ion secondary battery of the present invention is characterized in that it has the gas detecting material or the gas detector mentioned above near the face of the outer package of the lithium ion secondary battery. FIG. 4 is the schematic view of the lithium ion secondary battery of the present embodiment.

Lithium ion secondary battery 20 of the present embodiment contains battery part 21, outer package 22 which house battery part 21. Battery part 21 is composed of a positive plate, a negative plate and a separator between the positive plate and the negative plate. Battery part 21 is wound as a jelly-roll structure or laminated as a stack with the positive plate, the separator and the negative plate set in turn.

Positive electrode tab 23 and negative electrode tab 24 which electrical coupled with the electrode plates of battery part 21 is exposed in the outer space of the sealed plane 26 of outer package 22. The parts where electrode tab 23, 24 contacting with sealed plane 26 was coated by insulating tape 25 respectively.

Gas detector 10 adheres to outer package 22. Outer package 22 is composed of a non-sealed plane which house battery part 21 in the central part and a sealed plane which adhere to the non-sealed plane to form a bag-like shape. Herein, the adhering part with exposure parts for electrodes is called as sealed plane 26. The place for the gas detector adhering is not specified especially, but the vapor of the electrolyte solution or the decomposed gas of the electrolyte solution often leak out from the vicinity of sealed plane 26 and the gas detector is easy to be released especially in the vicinity of the electrodes, thus, the gas detector is preferred to be fixed to the vicinity of sealed plane 26.

The gas can be detected by setting the gas detecting material or the gas detector near the surface of the lithium ion secondary battery outer package of the present embodiment. The lithium ion secondary battery uses the cyclic or chain carbonate-based electrolyte solution. As chain carbonate such as DMC or DEC or the like has a lower boiling point, the sealability of the outer package is not sufficient, and pinhole or the like is produced in the outer package so that the vapor of these electrolyte solution components is leaked out as outgas. If the gas detecting material is contacted with the leaked gas, the leaked gas is adsorbed in to the molecule with high porosity and at the same time the state of the electron turn to high-spin state from low-spin state and the color tune changes. The leaked gas can be simply detected by visually comparing the difference of the color tune with the reference part.

Also, a gas detector without reference part 12 can also be used, in this case, the gas can be detected by confirming the change of the color tune of the detection part using the color samples prepared separately (for example, JPMA Standard paint colors, 2013, version G, manufactured by Japan Paint Manufacturers Association).

The leaked gas can also be detected in processes other than inspection process and transportation or storage by using the lithium ion secondary battery of the present embodiment.

EXAMPLES

Hereinafter, the present invention is further specifically described based on the examples. However the present invention is restricted by the following examples.

Example 1

(Preparation of the Porous Coordination Polymer)

Into an Erlenmeyer flask added with 240 mL of mixed solvent of distilled water and ethanol, 0.24 g of ammonium iron(II) sulfate hexahydrate, 0.1 g of L-ascorbic acid and 0.15 g of potassium tetracyanonickelate (II) monohydrate were added and stirred. The precipitated intermediate particles were collected and 0.1 g of the obtained intermediate particles were dispersed in the ethanol and 0.10 g of pyrazine was added in to it using 30 minutes. The deposited precipitate was filtrated and dried under 150° C. for 3 hours to obtain the orange porous coordination polymer. For the obtained porous coordination polymer, the X-ray powder diffraction pattern (FIG. 2) was measured by the methods mentioned above, and the ratio (A/B) of the diffraction peak intensity of (001) plane near 2θ=12° to the ratio of the diffraction peak intensity of (110) plane near 2θ=17° was calculated and the result was 1.7.

(Measurement for the Adsorbed Amount of the Porous Coordination Polymer)

Put the porous coordination polymer of Example 1 in the saturated gases of acetonitrile, DMC, and DEC respectively for 24 hours and then dry it under reduced pressure. For the porous coordination polymer with gas adsorbed, the content of the evolved gas until 220° C. was confirmed by using a gas chromatograph mass spectrometry equipped with double-shot pyrolyzer. The result was that, except very little water was detected in all of the samples, only acetonitrile, DMC and DEC was detected respectively The adsorbed amount of the gas was calculated by the method mentioned above using thermogravimetric analysis and the results were as follows. That is, the adsorbed amount of acetonitrile was 11.6%, the adsorbed amount of DMC was 15.0% and the adsorbed amount of DEC was 19.0%.

(The Preparation of Gas Detector)

The porous coordination polymer of Example 1 was impregnated in acetonitrile under 25° C. for 10 hours. After that, it was suction-filtrated using filter paper No. 5C and formed a reddish purple gas detecting material layer on the filter paper No. 5C by drying under reduced pressure. The spin state of the gas detecting material was confirmed using superconducting quantum interference device (SQUID) and the result was low-spin state.

On the back side of filter paper No. 5C which is the supporter formed with a gas detecting material layer, a double-faced adhesive tape with release layer was paste and then cut into small rectangular slices with a width of 5 mm, a length of 20 mm and a thickness of 0.5 mm. After that, a reference part was set for one half end of the detecting material layer by covering with a film of polyvinylidene chloride using a glue tape as the adhesive and the gas detector was finished.

(Detection of Diethyl Carbonate Gas)

A small fan and the gas detector were put into a Tedlar bag of 5 L. Air containing DEC was blasted into it to obtain a concentration of 200 ppm and the change of the color tune of the gas detector was confirmed. The result was that the detection part of the gas detector turned to be orange and difference of the color tune was confirmed comparing to the reference part. On the other hand, in the case where air without diethyl carbonate was blasted into the bag, the color of the detection part did not change and no difference of the color tune could be observed comparing to the reference part. Thereby, it could be confirmed that diethyl carbonate can be detected from the change of the color tune.

(Detection of other Gases)

Replacing diethyl carbonate, ethylene, propylene, toluene, xylene, acetone, ethyl acetate, tetrahydrofuran, methanol, ethanol, n-propanol, isopropanol, ammonia, dimethylamine, trimethylamine, triethylamine, acetic acid, formaldehyde, acetaldehyde, diethyl ether, dimethyl carbonate and ethyl methyl carbonate was used, the change of the color tune of the gas detector was confirmed in the same way, and the result was that the color of the detection part of the gas detector was changed and difference could be observed comparing to the reference part.

(Detection of the Leaked Gas of the Lithium Ion Secondary Battery)

Ten lithium ion secondary batteries were prepared with a gas detector attached near the sealed plane of the outer package respectively. Among these batteries, a pinhole was punched artificially using needle to simulate the condition when a pinhole was existed on the outer package. The batteries were put into the Tedlar bags respectively and sealed, and then placed for one hour. The gas detector of the lithium ion secondary battery was confirmed visually, the detection part of the gas detector of the lithium ion secondary battery with a pinhole turn to be orange which is different from the reference part. 10 μL of air in the Tedlar bag with this lithium ion secondary battery was fetched using a gas-tight syringe. As the result, about 200 ppm of diethyl carbonate was detected. On the other hand, the air in the Tedlar bags with the lithium ion secondary batteries of which the gas detector did not change was fetched respectively and the content was analyzed. As the result, no gas content from electrolyte solution could be detected.

Example 2

Except that 0.10 g of pyrazine was added in 1 hour, a porous coordination polymer and a gas detecting material were prepared in the same way as Example 1. The ratio (A/B) of the diffraction peak intensity, the adsorbed amounts of acetonitrile, DMC and DEC calculated in the same way as Example 1 were shown in Table 1.

(Detection of Diethyl Carbonate Gas)

The prepared gas detecting material in Example 2 was used to prepare a gas detector in the same way as in Example 1. The gas detector was used to try to detect DEC in the same way as in Example 1. The result confirmed that DEC can be detected from the change of the color tune.

Example 3

Except that 0.10 g of pyrazine was added in 45 minutes, a porous coordination polymer and a gas detecting material were prepared in the same way as Example 1. The ratio (A/B) of the diffraction peak intensity, the adsorbed amounts of acetonitrile, DMC and DEC calculated in the same way as Example 1 were shown in Table 1.

(Detection of Diethyl Carbonate Gas)

The prepared gas detecting material in Example 3 was used to prepare a gas detector in the same way as in Example 1. The gas detector was used to try to detect DEC in the same way as in Example 1. The result confirmed that DEC can be detected from the change of the color tune.

Example 4

Except that 0.10 g of pyrazine was added in 15 minutes, a porous coordination polymer and a gas detecting material were prepared in the same way as Example 1. The ratio (A/B) of the diffraction peak intensity, the adsorbed amounts of acetonitrile, DMC and DEC calculated in the same way as Example 1 were shown in Table 1.

(Detection of Diethyl Carbonate Gas)

The prepared gas detecting material in Example 4 was used to prepare a gas detector in the same way as in Example 1. The gas detector was used to try to detect DEC in the same way as in Example 1. The result confirmed that DEC can be detected from the change of the color tune.

Example 5

Except that 60 ml of mixed solvent of distilled water and ethanol was used and 0.10 g of pyrazine was added in 15 minutes, a porous coordination polymer and a gas detecting material were prepared in the same way as Example 1. The ratio (A/B) of the diffraction peak intensity, the adsorbed amounts of acetonitrile, DMC and DEC calculated in the same way as Example 1 were shown in Table 1.

(Detection of Diethyl Carbonate Gas)

The prepared gas detecting material in Example 5 was used to prepare a gas detector in the same way as in Example 1. The gas detector was used to try to detect DEC in the same way as in Example 1. The result confirmed that DEC can be detected from the change of the color tune.

Comparative Example 1

In a container, 0.24 g of ammonium iron(II) sulfate hexahydrate, 0.1 g of L-ascorbic acid, 0.15 g of potassium tetracyanonickelate (II) monohydrate and 0.10 g of pyrazine was stirred using 240 mL of mixed solvent of distilled water and ethanol to obtain a precipitate. By drying the precipitate in the atmosphere under 120° C. for 3 hours, an orange porous coordination polymer (0.11 g) was obtained. The ratio (A/B) of the diffraction peak intensity, the adsorbed amounts of acetonitrile, DMC and DEC calculated in the same way as Example 1 were shown in Table 1. The obtained porous coordination polymer was used to perform a process to turn to be in a low-spin state in the same way as Example 1. As the result, the porous coordination polymer did turn to be in the slow-spin state as Example 1, and changed into weak reddish purple, however, it reverted to orange after about 10 minutes and no more investigation could be performed.

Comparative Example 2

Except that 60 ml of mixed solvent of distilled water and ethanol was used, a porous coordination polymer and a gas detecting material were prepared in the same way as Comparative Example 1. The ratio (A/B) of the diffraction peak intensity, the adsorbed amounts of acetonitrile, DMC and DEC calculated in the same way as Example 1 were shown in Table 1. The obtained porous coordination polymer was used to perform a process to turn to be in a low-spin state in the same way as Example 1. As the result, the porous coordination polymer did turn to be in the slow-spin state as Example 1, and changed into weak reddish purple, however, it reverted to orange after about 8 minutes and no more investigation could be performed.

Comparative Example 3

Except that 0.10 g of pyrazine was added in 10 hours, a porous coordination polymer and a gas detecting material were prepared in the same way as Example 1. The ratio (A/B) of the diffraction peak intensity, the adsorbed amounts of acetonitrile, DMC and DEC calculated in the same way as Example 1 were shown in Table 1.

TABLE 1

| | The composition of porous coordination polymer | The ratio (A/B) of the diffraction peak intensity | The adsorbed amount of acetonitrile (wt %) | The adsorbed amount of DMC (wt %) | The adsorbed amount of DEC (wt %) | The judgment |
|---|---|---|---|---|---|---|
| Example 1 | $Fe_{0.99}(pz)[Ni_{1.0}(CN)_4]$ | 1.7 | 11.6 | 15.0 | 19.0 | ○ |
| Example 2 | $Fe_{0.99}(pz)[Ni_{1.0}(CN)_4]$ | 5.8 | 12.1 | 22.0 | 26.0 | ○ |
| Example 3 | $Fe_{0.99}(pz)[Ni_{1.0}(CN)_4]$ | 3.2 | 11.8 | 21.0 | 23.0 | ○ |
| Example 4 | $Fe_{0.99}(pz)[Ni_{1.0}(CN)_4]$ | 0.91 | 11.2 | 14.3 | 17.9 | ○ |
| Example 5 | $Fe_{0.99}(pz)[Ni_{1.0}(CN)_4]$ | 0.80 | 10.5 | 12.2 | 15.6 | ○ |
| Comparative Example 1 | $Fe_{0.99}(pz)[Ni_{1.0}(CN)_4]$ | 0.74 | 8.1 | 9.2 | 9.7 | x |
| Comparative Example 2 | $Fe_{0.99}(pz)[Ni_{1.0}(CN)_4]$ | 0.68 | 7.6 | 8.5 | 8.9 | x |
| Comparative Example 3 | $Fe_{0.99}(pz)[Ni_{1.0}(CN)_4]$ | 6.4 | 8.3 | 9.1 | 9.5 | x |

* (pz = pyrazine)

(Detection of Diethyl Carbonate Gas)

Refer to the detectors of Examples 2 to 5 and Comparative Example 3, a change in the color tune caused by diethyl carbonate gas could be confirmed as in Example 1. In the detectors of Examples 2 to 5, the detection part of the gas detectors turned orange and a change in the color tune comparing with the reference part could be observed. In the detector of Comparative Example 3, weak reddish purple was shown and the change in the color tune caused by diethyl carbonate gas was confirmed as in Example 1, but the difference of the color tune comparing with the reference part was not so clear.

Examples 6 to 15 and Comparative Examples 4 to 6

Except that ammonium iron(II) sulfate hexahydrate, potassiumtetracyanonickelate (II) monohydrate, potassium tetracyanopalladate(II) hydrate and potassium tetracyanoplatinate(II) hydrate were weighed to obtain the composition of Table 2, a porous coordination polymer and a gas detecting material were prepared in the same way as Example 1. The ratio (A/B) of the diffraction peak intensity, the adsorbed amounts of acetonitrile, DMC and DEC calculated in the same way as Example 1 were shown in Table 2.

TABLE 2

| | The composition of porous coordination polymer | The ratio (A/B) of the diffraction peak intensity | The adsorbed amount of acetonitrile (wt %) | The adsorbed amount of DMC (wt %) | The adsorbed amount of DEC (wt %) | The judgment |
|---|---|---|---|---|---|---|
| Example 6 | $Fe_{0.98}(pz)[Ni_{0.98}Pd_{0.02}(CN)_4]$ | 1.7 | 11.6 | 15.0 | 19.0 | ○ |
| Example 7 | $Fe_{0.95}(pz)[Ni_{0.98}Pd_{0.02}(CN)_4]$ | 1.4 | 11.1 | 13.7 | 18.5 | ○ |
| Example 8 | $Fe_{1.05}(pz)[Ni_{0.98}Pd_{0.02}(CN)_4]$ | 1.4 | 11.1 | 13.7 | 18.5 | ○ |
| Example 9 | $Fe_{0.98}(pz)[Ni_{0.98}Pd_{0.02}(CN)_4]$ | 1.6 | 11.5 | 14.8 | 19.1 | ○ |
| Example 10 | $Fe_{0.98}(pz)[Ni_{0.98}Pt_{0.02}(CN)_4]$ | 1.5 | 11.6 | 15.1 | 19.0 | ○ |
| Example 11 | $Fe_{1.02}(pz)[Ni_{0.98}Pt_{0.02}(CN)_4]$ | 1.7 | 11.5 | 14.7 | 19.1 | ○ |
| Example 12 | $Fe_{0.98}(pz)[Ni_{0.94}Pt_{0.06}(CN)_4]$ | 1.6 | 11.4 | 14.4 | 18.4 | ○ |
| Example 13 | $Fe_{0.98}(pz)[Ni_{0.98}Pd_{0.01}Pt_{0.01}(CN)_4]$ | 1.6 | 11.6 | 14.8 | 19.2 | ○ |
| Example 14 | $Fe_{0.98}(pz)[Ni_{0.86}Pt_{0.09}(CN)_4]$ | 0.94 | 10.9 | 12.4 | 16.7 | ○ |
| Example 15 | $Fe_{0.98}(pz)[Ni_{0.86}Pt_{0.14}(CN)_4]$ | 0.88 | 10.7 | 11.8 | 15.3 | ○ |
| Comparative Example 4 | $Fe_{0.94}(pz)[Ni_{0.98}Pd_{0.02}(CN)_4]$ | 0.75 | 8.1 | 9.2 | 9.7 | × |
| Comparative Example 5 | $Fe_{1.06}(pz)[Ni_{0.98}Pd_{0.02}(CN)_4]$ | 0.68 | 7.9 | 8.9 | 9.2 | × |
| Comparative Example 6 | $Fe_{0.98}(pz)[Ni_{0.84}Pt_{0.16}(CN)_4]$ | 0.65 | 7.5 | 8.6 | 9.8 | × |

* (pz = pyrazine)

(Detection of Diethyl Carbonate Gas)

Refer to the detectors of Examples 6 to 15 and Comparative Examples 4 to 6, a change in the color tune caused by diethyl carbonate gas could be confirmed as in Example 1. In the detectors of Examples 6 to 15, the detection part of the gas detectors turned orange and a change in the color tune comparing with the reference part could be observed. In the detector of Comparative Examples 4, 5 and 6, weak reddish purple was shown and the change in the color tune caused by diethyl carbonate gas was confirmed as in Example 1, but the difference of the color tune comparing with the reference part was not so clear.

It could be known from the results above that, the porous coordination polymer of the examples had excellent gas adsorption properties and could be used as gas detecting material. The leaked gas could be detected by equipping such detecting material in the lithium ion secondary battery.

DESCRIPTION OF REFERENCE NUMERALS

1 . . . Porous coordination polymer
2 . . . Ferrous ion
3 . . . Tetracyanonickelate ion
4 . . . Pyrazine
10 . . . Gas detector
11 . . . Detection part
12 . . . Reference part
13 . . . Gas detecting material
14 . . . Supporter
15 . . . Protective layer
16 . . . Adhesive layer
17 . . . Release paper
20 . . . Lithium ion secondary battery
21 . . . Battery part
22 . . . Outer package
23 . . . Positive electrode tab
24 . . . Negative electrode tab
25 . . . Insulating tape
26 . . . Sealed plane of the outer package

What is claimed is:

1. A porous coordination polymer represented by the following formula (1), wherein the ratio A/B of the diffraction peak intensity A of (001) plane to the diffraction peak intensity B of (110) plane is 0.8 or more and 5.8 or less, $$Fe_x(pz)[Ni_{1-y}M_y(CN)_4] \quad (1)$$

where:
pz represents pyrazine,
$0.95 \leq x < 1.05$,
M represents at least one of palladium and platinum, and
$0 \leq y < 0.15$.

2. A gas detecting material comprising the porous coordination polymer according to claim 1.

3. A gas detecting material comprising:
the porous coordination polymer according to claim 1, and
at least one selected from the group consisting of acetonitrile and acrylonitrile,
wherein the porous coordination polymer is in low-spin state.

4. A lithium ion secondary battery comprising the gas detecting material according to claim 2.

5. A lithium ion secondary battery comprising the gas detecting material according to claim 3.

6. The lithium ion secondary battery according to claim 4, wherein the gas detecting material is present on a surface of an outer package of the lithium ion secondary battery.

7. The lithium ion secondary battery according to claim 5, wherein the gas detecting material is present on a surface of an outer package of the lithium ion secondary battery.

\* \* \* \* \*